INVENTORS
NORMAN L. PETERSON
GRADY B. ALLEN
BY Lieber & Nilles
ATTORNEYS

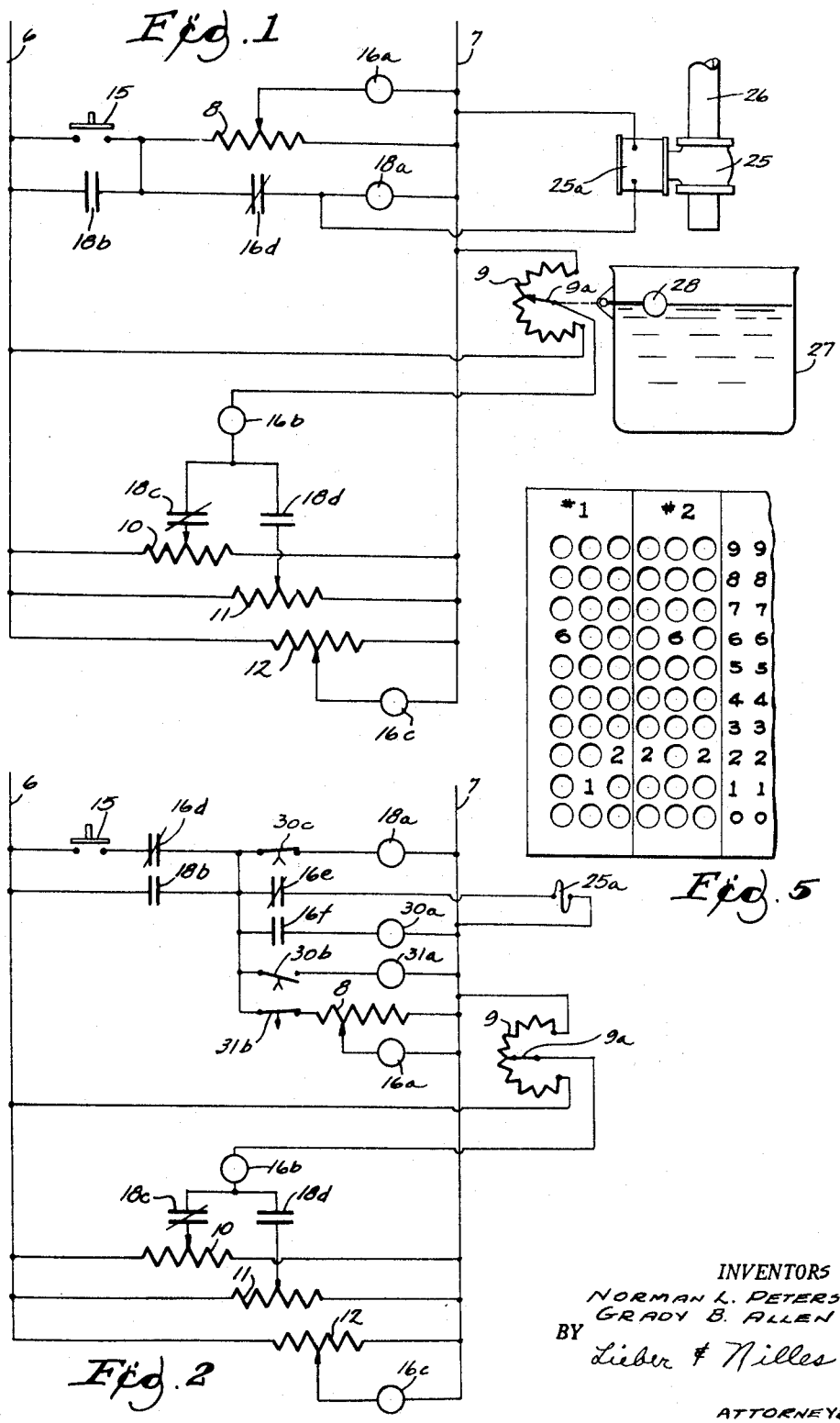

United States Patent Office 3,286,084
Patented Nov. 15, 1966

3,286,084
PUNCH CARD FOR CONTROL SYSTEM FOR
MATERIAL HANDLING
Norman L. Peterson, Wauwatosa, and Grady B. Allen,
Milwaukee, Wis., assignors, by mesne assignments, to
The T. L. Smith Company, Milwaukee, Wis., a corporation of Wisconsin
Original application Nov. 4, 1960, Ser. No. 67,314, now
Patent No. 3,133,233, dated May 12, 1964. Divided
and this application July 24, 1963, Ser. No. 297,373
3 Claims. (Cl. 235—61.12)

This invention relates to an automatic system for metered control of a material or a group of materials or of a mechanical condition or property of such materials which can be measured.

This is a divisional application of U.S. Patent No. 3,133,233, issued May 12, 1964, entitled, "Control System for Material Handling."

In systems where a material or materials are to be metered, the quantity of material received is the product of the time and the rate at which the material is received. If the amount of material received, its weight, depth or other measurable condition or property can be transduced to an electrical signal, preferably a voltage ratio, the system can be electrically controlled. When mechanical values such as indicated above are to be transduced to electrical signals, it is convenient to translate the mechanical value into a change in position and then into an electric signal in an electrical device such as a potentiometer, a differential transformer or the like, as the transducing device.

In the use of a potentiometer as a transducer, a voltage impressed across the potentiometer is divided into two values dependent on the position of the movable contact and on the ratio of resistance from the movable contact to the two voltage source lines. When the position of the movable potentiometer contact is to be transduced into a voltage ratio, it is desirable to have the minimum voltage ratio represent the zero of the transduced mechanical value. However, it is difficult to maintain a minimum or zero voltage ratio because the zero position of a potentiometer contact is not usually at the physical endpoint of the resistor. The present application discloses means whereby the difficulty of obtaining a minimum or zero voltage ratio does not limit or otherwise affect operation of the system.

The basic control system with which the present invention may be used, is readily amended by addition of two relays which give an "off-on" modulation just prior to the time at which the circuit is to operate to control a material or materials. Such cycling is continued until the vector sum of the ampturns of certain of the relays windings exceeds zero and the re-cycling automatically stops. The basic control system can also be extended to provide metering of values in terms of units, tens and hundreds and of a plurality of conditions or properties or materials. The various portions of the systems are easily interconnected and a selector switch is used to determine the amount of each value which is permitted to pass through the system.

One object of the present invention is to provide punch cards for controlling electrical switches in a material handling control system, which cards have a readily readable indication of the formula of the mix to be measured by the system. More specifically, these cards have a plurality of parallel columns, each column representing a different material to be measured, and each column containing a hundreds row, a tens row, and a units row of numerals; the numerals in each row being arranged in numerical order in a vertical direction. The arrangement is such that at least some of the numerals are punched from the card so as to leave one number in each of at least some of the rows to thereby provide a visual numerical indication on the punched card of the quantities of material to be measured by the electrical switches of the control system.

These and other objects and advantages of the present invention will appear hereinafter as this disclosure progresses, reference being had to the accompanying drawings, in which:

FIGURE 1 illustrates the basic control system by which a mechanical value (position) is transduced into a voltage ratio and such voltage ratio is employed to control the amount of a material passing through a valve;

FIGURE 2 illustrates the system of FIGURE 1 with the addition of two timing relays and two additional contacts for a previously used relay, by which an "off-on" modulation of the control circuit may be obtained to secure more accurate operation of the means for controlling the mechanical value of the material being handled;

Figure 4:
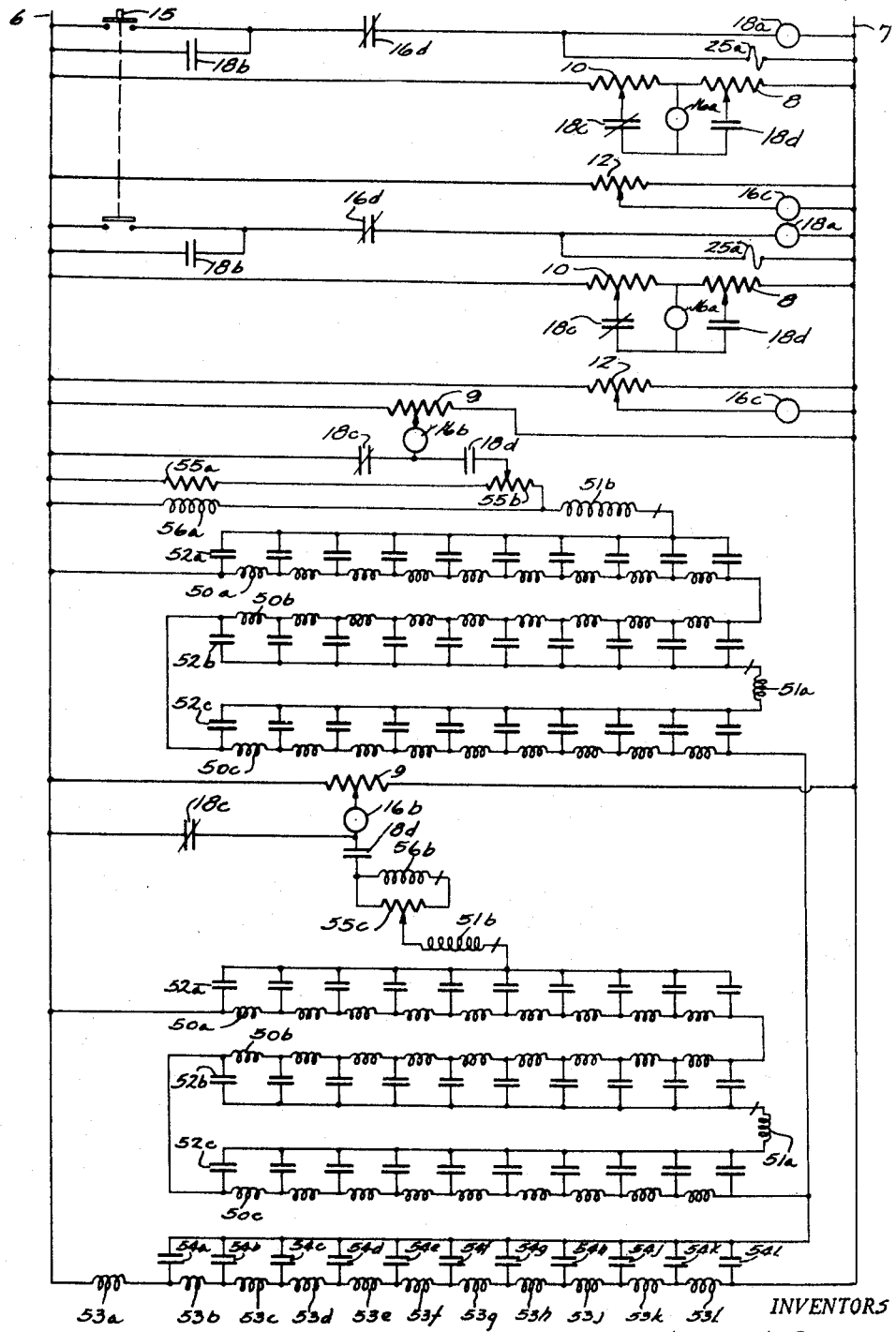

FIGURE 4 illustrates a control system in which two materials are controlled and in units, tens or hundreds as desired, a selector switch coacting with a card in determining the amount of each value passing through the system, control of more materials merely requiring duplication of system parts; and FIGURE 5 is a plan view of a fragment of a card for operating the switches of the system shown in FIGURE 4.

In FIGURE 1, a number of potentiometers are used to transduce a mechanical value namely a change in level within a container, into an electrical signal and, in combination with a number of relays operate a contact or contacts, the circuit controlling electrical means for controlling the amount of the material passing through the system and thereby controlling the level of material. Referring particularly to FIGURE 1, voltage source lines 6, 7 are connected by a number of potentiometers designated 8, 9, 10, 11 and 12, the potentiometers respectively serving as a compensation adjuster, output transducer, a zero interlock potentiometer, an input transducer and a zero voltage ratio adjuster. These circuits include a voltage sensing relay having a plurality of windings 16a, 16b and 16c for operating a normally closed contact 16d, and a relay having a single winding 18a and operating contacts 18b, 18c and 18d, and a starting switch 15. The above circuits control the flow of electric power to means of some kind for controlling the flow of material, such as the electric operator 25a of a valve 25 in a conduit 26 by which material is discharged into a container 27. The level of liquid in the container is determined by reaction of a float 28 operating on movable contact 9a of the output transducer 9.

Relay 16a–16d is required to open its contact 16d when the vector sum of the ampturns of winding 16a plus winding 16b and plus winding 16c are in phase (positive) with the supply voltage from line 6 to line 7, and to close such contact when the above vector sum is out of phase (negative) relative to the supply voltage. (To calibrate the control circuit dynamically, the values of current circulating through the windings 16a and 16c are adjustable as will be understood by one skilled in the art.)

Assuming that transducer 9, 9a is set for its minimum practical output value with transducer 11 set at zero, and that relay winding 16b is connected between transducers 9 and 10, the impedance of winding 16b is very high but current flows through such winding which then causes opening of contact 16d. Current flow through winding 16c is then so adjusted that the value of the ampere turns of winding 16c is exactly equal and opposite to the ampere turns of the current flowing in winding 16a. The vector sum of the ampere turns of winding 16b and 16c is less than zero by the setting of the potentiometer and contact 16d remains closed even though the output of transducer 9 is not exactly at zero. If the starting switch 15 is now closed, power is applied to the relay windings 18a and contact 18c is opened while contacts 18b and 18d are closed. Power is then furnished to the electric operator 25a for opening the valve 25.

At this time the winding 16b is connected between the output transducer 9 and the input transducer 11. When the material in container 27 reaches the desired level, the total vector sum of the ampere turns of winding 16a and 16c will cause contact 16d to open. Relay winding 18a and the valve operator 25a are then deenergized to cut off the flow of material. However, there are inherent time delays in any system, e.g., contact 16d can open only after the sum of the vector turns of windings 16a and 16c equals zero and the valve operator 25a begins to move in one direction only after the contact 16d is open. In the present system, all such delays are compensated by winding 16a which is so connected to the compensation adjuster potentiometer 8 as to cause contact 16d to open a controlled time before the level of material in container 27 reaches its desired valve.

In cases where the controlling condition or property of the material are highly non-linear functions of time and/or where large changes in the controlling condition or property can occur within the time lags inherent in the system, an "off-on" modulation can be applied to the system just before the point at which the controlling action of the circuit is to take place. A modulating system is shown in FIGURE 2 which differs from FIGURE 1 in the addition of contacts 16e and 16f to relay 16a–16d of FIGURE 1 and an "off" timer relay with a winding 30a and contacts 30b and 30c and an "on" timer relay with winding 31a and contact 31b are added to the circuit.

The system of FIGURE 2 is again assumed to have its output potentiometer-transducer 9 set to its minimum practical output when the controlling material condition or property and the input potentiometer-transducer 11 are both at zero. Relay winding 16b is connected between output transducer 9 and zero interlock potentiometer 10, and even though the impedance of such winding is quite high, sufficient current flows through the winding to cause contacts 16d and 16e to open and contact 16f to close. Current flow through winding 16c is then so adjusted that the total of ampere turns of winding 16c is now exactly equal to and opposite to the ampere turns of winding 16b. The vector sum of the ampere turns of winding 16b plus winding 16c is then less than zero by the resistance of potentiometer 10 contacts 16d and 16c are reclosed and contact 16f is reopened, contact 16c and 16e being normally closed and contact 16f being normally open.

Pressure on the starting switch 15 now applies power to the relay winding 18a which closes normally open contacts 18b and 18d while normally closed contacts 18c are opened. Power is also applied to the electric operator 25a for control of flow of the materials. Relay winding 16b is now connected between the output transducer 9 and the input transducer 11, relay winding 16c compensating for changes in output of the transducer 9. Relay winding 16a is energized by current proportional to the amount of modulation desired in the system. Such current provides a vector sum of ampere turns of relay winding 16b plus winding 16a plus winding 16c which exceeds zero just before the controlling material condition reaches the desired value and contacts 16d, 16e and 16f are shifted to the opposite of the positions shown in the drawings. Thus normally closed contacts 16d and 16e are opened and electric drive 25a is deenergized so that the system is in the "off" condition.

Putting the system in the "off" position as described above also closes contact 16f and causes the "off" relay timer 30a to be energized. Such relay has two sets of contacts which operate in sequence namely 30b, 30c with some time delay between the action of the two contacts. After a predetermined time, normally open contact 30b closes and energizes winding 31a of the "on" relay timer. Normally closed "on" timer contacts 31b open immediately and winding 16a is deenergized. If the controlled material property has not yet reached the desired value, the vector sum of the ampere turns of winding 16b and plus winding 16c will be less than zero and contacts 16b and 16e will close to energize electric operator 25a and to deenergize timer windings 30a and 31a.

After a predetermined time, normally closed contact 31b will reclose so that the off-on cycle is repeated. Recycling continues until the vector sum of the amptturns turns on winding 16b and 16c exceeds zero with winding 16a deenergized. At this time normally closed contact 30c will open to deenergize relay 18a and contacts 18b, 18c and 18d return to the positions shown in the drawing.

Figure 3:
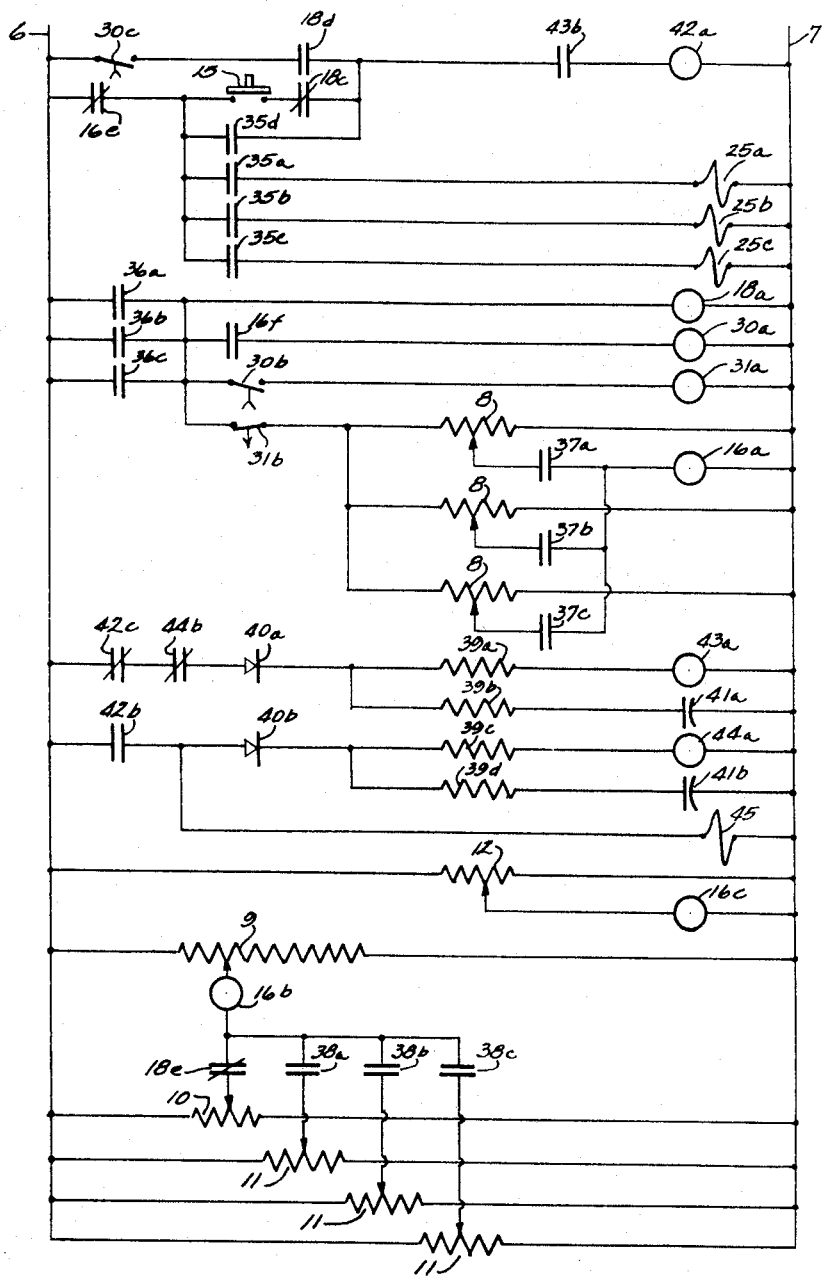
FIGURE 3 illustrates a modification of FIGURE 2, in which a step switch is used in combination with other parts to secure control of a number of conditions in a particular sequence.

FIGURE 3 is a combination of three of the circuits shown in FIGURE 2 for controlling a number of conditions in a given sequence by use of a step switch, the step switch having five stable states (as opposed to two stable states of a relay). Parts corresponding to those found in FIGURE 2 are designated by the same reference numbers as in FIG. 2. In addition to such similar parts, the step switch is indicated as being of the four deck type with groups of contacts 35a–d, 36a–d, 37a–c and 38a–c, four resistors 39a–d are connected in two parallel groups and supply current by way of rectifiers 40a and 40b, two resistors are connected to the voltage line 7 by way of capacitors 41a and b. The winding and sets of contacts of a number of relays are designated 42a–c, 43a and b and 44a and b. The numeral 45 designates the electric operating means for the step switch.

The operation of the step switch is brought about by closing the starting switch 15 which energizes relay winding 42a to close contact 42b and energize the step switch operating means 45. Relays 43 and 44 are capacity operated timing relays for pulsing the switch operator 45 and coact with relay 42 in energizing such operator, but such effect could be obtained by other known means for actuating a step switch. When the step switch operator 45 is first energized, contacts 35a, 36a, 37a and 38a are closed. Upon the second energization of the switch operator 45 the above contacts are opened and contacts 35b, 36b, 37b and 38b are closed, and at the third operation energization of the switch operator 45 the above "b" contacts are opened and contacts 35c, 36c, 37c and 38c are closed. Another energization of the switch operator 45 opens the above "c" contacts and closes contact 35d, and further energization of such operator returns the step switch to the "off" position.

When contact 35a, 36a, 37a and 38a are closed, the first condition control operator 25a is energized and continues to be energized until the vector sum of the ampere turns of winding 16a plus winding 16b plus winding 16c exceeds zero. At this time the "off-on" modulation described in connection with FIGURE 2, begins and acts as previously described until the controlled condition reaches the pre-set condition. At such time the step switch contacts 35a, etc., will open and contacts 35b, etc., will close. The second condition control operator 25b is now energized, and the above process is repeated. On the third operation of step switch to close contacts 35c, etc., the third control operator 25c is energized and acts until a preset condition is reached. Further operation of the step switch is impossible until the transducer 9 returns to zero whereupon the switch moves to the "off" position and is in position to start a new cycle.

FIGURE 4 illustrates two systems similar to that shown in FIGURE 1, which are combined in such a manner that the input signal is derived from a combination of switch contacts and transformers so arranged as to lend themselves to operation by use of punch cards or punched tape and selector switches. Three decades of switches are used to represent units, tens, and hundreds of the desired value for one or more materials on the cards representing the desired formula. Each switch decade is associated with a voltage divider such as a transformer having three series of nine equal windings, the second series of nine equal windings being 1/10 the size of the first set of windings and the third series of nine equal windings being 1/100 the size of the first series of windings. Each similar portion of the circuit of FIGURE 4 includes a three decade switch and a voltage divider and such parts are connected by other transformers.

Referring particularly to FIGURE 4, it will be seen that relays 18a–d of the two combined circuits are provided with a number of contacts 18c and 18d which perform exactly the same functions as previously described and which are therefore given the same reference numerals. Each of the two sub-circuits has a transformer having three series of windings 50a, 50b and 50c, each series of windings being equal as to the other windings in that series. But the windings 50b are only 1/10 the size and windings 50c are only 1/100 the size of windings 50a. Therefore windings 50c measure units, windings 50b measure tens and windings 50a measure hundreds of a given value for material controlled by the switches 52a–c.

Switch contacts 52b and c are connected by transformer winding 51a and these serve as a source of energy for transformer 51. The several switch decades 52a have connected therewith the transformer windings 51b. A line with a fixed resistor 55a and a variable resistor 55b and a parallel line with a transformer 56a are connected to the transformer winding 51b and to the voltage source 6. Resistors 55b and c are mechanically coupled and actually form a duplex potentiometer. The second transformer 51b is also connected by way of the variable resistors 55c and transformers 56b to the line 6 through contacts 18c and d. A connecting transformer and three decades of switches join the two sets of transformer windings 50a–c and the switches 52a–c through another transformer 53a. The connecting transformer has windings which are not equal in size and which are therefore given separate numerals 53a–1. Such connecting transformer serves as a multiplier or divider for the digits of the units, tens and hundreds transformers previously described and allows further change in results obtainable from the present system.

FIGURE 5 illustrates a punch card which is used to control the operations of selector switches 52a, b, c, etc. of FIGURE 4. Columns #1 and #2 of the card have been punched to leave the values 612 in column #1 and 262 in column #2. Thus, if material to the amounts of 612 and 262 units respectively are to be mixed, such a mixture is controlled by the punch card. For example, the hundreds contact of third switch decade 52c, the tens contact of the second switch decade 52b and the units contact of the first switch decade 52a will be closed to achieve 612 units of one material.

When different materials are to be mixed in different quantities as is true when mixing cement, water and aggregate to form concrete for different uses, the card should show the complete formula for the particular concrete. Column 1 is used to control the pounds of cement, column 2 to control the pounds of water, column 3 to control the pounds of sand and the succeeding columns are used to control the weight of different sizes of stone or other aggregate. Each column contains a hundreds, tens and units column and all numerals are punched out except those showing a particular amount of the material represented in a particular column, so that each card shows the formula for which it is intended. The card is read by the normally open switches 52a etc., the groups of switches being arranged in the same relationship as the numbers on the card. Thus insertion of a card into a reader closes those switches matching the numbers not punched out of the card.

Assuming that a card has been punched to show the following formula:

|  | Lbs. |
| --- | --- |
| Cement | 612 |
| Water | 262 |
| Sand | 1090 |
| Stone (small) | 1030 |
| Stone (large) | 1000 | only the numerals 612 will show in column 1, only the numerals 262 will show in colmun 2 and the other columns will show only the numerical expression for the particular material alloted to a given column. Obviously the systems and cards can be set up to meter any desired amounts and are not limited to even four digit amounts.

Sometimes the variable to be controlled in one sub-circuit affects the other sub-circuit and such action needs to be compensated without need for setting up other punch cards. The parts used for compensation are the fixed resistor 55a and the duplex variable resistors 55b and c. Fixed resistor 55a and the variable resistor section 55b are so connected with the voltage input to the affected sub-circuit is increased by the amount of the undesired effect. The primary 56a (of transformer 56 and b) is connected across the voltage input representing the desired value for the first sub-circuit and the secondary 56b of the transformer is connected in the input circuit for the second sub-system so that part of the voltage obtained from the second variable resistor 55 opposes the voltage ratio representing the desired value for material in the second sub-system. Hence, there is automatic compensation for any undesirable effect transmitted between the two sub-circuits.

Various modes of carrying out the invention are contemplated as being within the scope of the following claims particularly pointing out and distinctly claiming the subject matter which is regarded as the invention.

I claim:

1. A material weighing handling system punch card for controlling the operation of switches in a control system, said card comprising; a plurality of parallel columns, each column of which represents a different material to be measured; at least some of said columns containing a units row, a tens row, and a hundreds row of numerals, the numerals in each row being arranged in numeral order in a vertical direction; at least some of said numerals being punched from said card so as to leave only one number in each row to thereby provide a directly readable visual numerical indication on the punched card of the number themselves which indicate quantities of material to be measured by said switches.

2. A material weighing handle system punch card for controlling the operation of switches in a control system, said card comprising; a plurality of parallel columns, each column of which represents a different material to be measured; at least some of said columns containing a units row, a tens row, and a hundreds row of numerals, the numerals in each row being arranged in numerical order in a vertical direction; at least some of said numerals being punched from said card so as to leave one number in each row to thereby provide a directly readable visual numerical indication on the punched card of the numbers themselves which indicate quantities of material to be measured by said switches, said card being insertible into a reader for closing those switches matching the numbers not punched out of said card.

3. A material weighing handling system punch card for controlling the operation of switches in a control system, said card comprising; a plurality of parallel columns, each column of which represents a different material to be measured; at least some of said columns containing a plurality of rows of numerals, the corresponding numerals in successive rows being related by the number 10, the numerals in each row being arranged in numerical order in a vertical direction; at least some of said numerals being punched from said card so as to leave one number in each row to thereby provide a directly readable visual numerical indication on the punched card of the numbers themselves which indicate quantities of material to be measured by said switches.

References Cited by the Examiner

UNITED STATES PATENTS

| | | | |
|---|---|---|---|
| 2,054,811 | 9/1936 | Goerlitz | 235—61.12 |
| 2,192,695 | 3/1940 | Rainey | 235—61.12 |
| 2,537,778 | 1/1951 | McCormick | 235—61.12 |
| 3,045,905 | 7/1962 | Tarasuk | 235—61.12 |

ROBERT C. BAILEY, *Primary Examiner.*

MALCOLM A. MORRISON, DARYL W. COOK,
*Examiners.*

G. D. SHAW, *Assistant Examiner.*